D. P. DAVIS.
Velocipede Wheel.

No. 93,067. Patented July 27, 1869.

United States Patent Office.

D. P. DAVIS, OF NEW YORK, N. Y., ASSIGNOR TO HIMSELF, WILLIAM J. COOMBS, AND GEORGE H. GARDNER.

Letters Patent No. 93,067, dated July 27, 1869.

IMPROVEMENT IN CARRIAGE-WHEELS.

The Schedule referred to in these Letters Patent and making part of the same.

To all whom it may concern:

Be it known that I, D. P. DAVIS, of the city and State of New York, have invented and made a certain new and useful Improvement in Wheels for Velocipedes; and I do hereby declare the following to be a full, clear, and exact description of the said invention, reference being had to the annexed drawing, making part of this specification, wherein—

Figure 1:
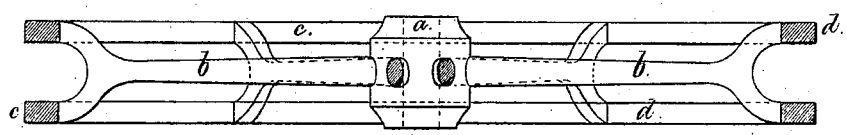
Figure 2:
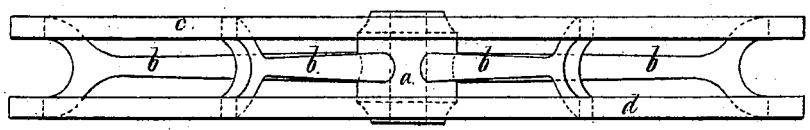

Figure 1 is a vertical section of said wheel, and
Figure 2 is a plan of the same.

Similar marks of reference denote the same parts.

The velocipedes that have heretofore been made, have had two, three, or more wheels of ordinary construction. In the two-wheeled velocipedes, there is difficulty in an inexperienced person balancing himself, because the two wheels are in the same plane. With velocipedes having three or more wheels, there is an increase of friction, and of difficulty in steering the apparatus.

My invention consists in a wheel adapted to two-wheeled velocipedes, whereby the same will be rendered more steady, and the friction will not be increased, said wheel being formed with two rims or tires, with an open space between them, and connected, by spokes, with one hub.

By this construction, there will be a sufficient width of tread to the wheel to cause the velocipede to run much more firmly than heretofore, and parties can learn to balance themselves, and ride said velocipedes much more rapidly.

In the drawing—

$a$ represents the hub, $b\ b$, the spokes, $c$ and $d$, the rims or tires of the wheel, leaving a space between them, of a width sufficient to cause the velocipede to travel steadily; and this space will depend upon the diameter of the wheel, or the height of the seat from the ground.

The spokes $b\ b$ are represented as formed with a fork at the outer end, to reach to the respective rims $c$ and $d$, in order that single spokes may be employed, extending out from the hub, in the usual manner, and then reaching the respective rims by means of said forked end branching out, as represented.

What I claim, and desire to secure by Letters Patent, is—

The spokes $b\ b$, formed with forked ends, in combination with the two rims, connected with, and sustained, at the desired distance apart, by said forked spokes, as specified.

In witness whereof, I have hereunto set my signature, this 25th day of January, 1869.

D. P. DAVIS.

Witnesses:
CHAS. H. SMITH,
GEO. T. PINCKNEY.